United States Patent [19]

Schmidt

[11] 4,075,897

[45] Feb. 28, 1978

[54] APPARATUS FOR OBTAINING RELATIVE ORBITAL MOVEMENT IN ELECTRICAL DISCHARGE MACHINING

[75] Inventor: Fred Schmidt, Cranford, N.J.

[73] Assignee: Triangle Tool Company, Union, N.J.

[21] Appl. No.: 638,930

[22] Filed: Dec. 8, 1975

Related U.S. Application Data

[63] Continuation-in-part of Ser. No. 547,082, Feb. 4, 1975, abandoned.

[51] Int. Cl.² ............................................. F16H 33/10
[52] U.S. Cl. .................................... 74/86; 219/69 V; 74/55
[58] Field of Search ............................ 74/86, 567, 55; 219/69 V; 33/1 M

[56] References Cited

U.S. PATENT DOCUMENTS

| 883,827 | 4/1908 | Rathbun | 74/86 |
|---|---|---|---|
| 2,027,926 | 1/1936 | Meyers et al. | 33/1 M |
| 2,991,657 | 7/1961 | Schatz | 74/86 |
| 2,995,826 | 8/1961 | Brault | 33/125 T |
| 3,160,744 | 12/1964 | Weiss | 74/567 |
| 3,663,785 | 5/1972 | Hausermann | 219/69 V |
| 3,671,705 | 6/1972 | Raznitsyn | 219/69 V |
| 3,703,834 | 11/1972 | Beezer | 74/57 |

FOREIGN PATENT DOCUMENTS

| 611,770 | 11/1948 | United Kingdom | 33/1 M |

*Primary Examiner*—Benjamin W. Wyche
*Assistant Examiner*—Wesley S. Ratliff, Jr.
*Attorney, Agent, or Firm*—Samuelson & Jacob

[57] ABSTRACT

A pair of orthogonal drive shafts carry cams which are coupled to a platform for orbital movement of the platform. The platform supports a workpiece below an electrode in an electrical discharge machining operation. The cams are cylindrical segments which extend axially at an acute angle to their respective drive shafts so as to present a changing throw along the axial extent of the cams and the coupling means is selectively adjustable along the axial extent of the cams to enable selection of the amplitude of the orbit. In another embodiment, a single drive shaft carries cams each having a throw extending perpendicular to the drive shaft and a further cam having a throw parallel to the drive shaft. The cams are coupled to a platform for orbital movement of the platform and have changing throws in the respective directions of the throws to enable selection of the amplitude of the orbit.

29 Claims, 11 Drawing Figures

APPARATUS FOR OBTAINING RELATIVE ORBITAL MOVEMENT IN ELECTRICAL DISCHARGE MACHINING

This application is a continuation-in-part of my application Ser. No. 547,082, filed Feb. 4, 1975, now abandoned, for Apparatus For Obtaining Relative Orbital Movement In Electrical Discharge Machining.

The present invention relates generally to machine tools and pertains, more specifically, to apparatus for obtaining relative orbital movement between the tool and the workpiece in electrical discharge machining.

Present techniques in electrical discharge machining recognize the advantages of providing relative orbital motion between the workpiece and the electrode employed for machining the workpiece. Prior to the use of such techniques, two or more electrodes were used as machining proceeded from rougher to finer surface finishes in a complete machining operation. The employment of relative orbital movement has enabled the use of only a single electrode for both rough machining and subsequent finer finishing.

In addition to the above ability to attain rougher and then finer surface finishes with a single electrode, the availability of relative orbital movement between the electrode and the workpiece enables the machining of a cavity having a configuration complementary to that of the electrode, but with dimensions enlarged by an amount determined by the amplitude of the orbital movement. Well controlled relative orbital motion thus can achieve closely controlled tolerances in the manufacture of precision parts, such as master dies, utilizing electrical discharge machining.

It is therefore an object to the invention to provide apparatus for obtaining closely controlled, accurate orbital movement of a driven member such that relative orbital motion can be attained between the workpiece and the electrode in electrical discharge machining.

Another object of the invention is to provide apparatus of the type described wherein the amplitude of the orbital movement is selectively adjustable for accurate setting of the orbital displacement, and wherein adjustment may be accomplished while the apparatus is in operation.

A further object of the invention is to provide a simplified arrangement of component parts for attaining selectively adjustable orbital movement of a driven member.

A still further object of the invention is to provide apparatus as described above which is rugged and will perform as required, essentially unaffected by the environment present in electrical discharge machining apparatus.

Still another object of the invention is to provide apparatus of the type described which economically can be manufactured from a minimal number of easily fabricated component parts.

The above objects, as well as still further objects and advantages, are attained by the invention which may be described briefly as apparatus for obtaining orbital movement of a driven member, the apparatus comprising a frame, a first cam mounted for rotation on the frame, the first cam having a given cam surface and throw, the throw of the first cam extending in a first direction, a second cam mounted for rotation on the frame, the second cam having a given cam surface and throw, the throw of the second cam extending in a second direction transverse to the first direction, drive means for simultaneously rotating both cams in synchronism, first coupling means coupling the driven member with the first cam for reciprocating movement along the first direction in response to rotation of the first cam, the first coupling means permitting simultaneous reciprocating movement of the driven member relative to the first cam along the second direction independent of the first cam, and second coupling means coupling the driven member with the second for reciprocating movement along the second direction in response to rotation of the second cam, the second coupling means permitting simultaneous reciprocating movement of the driven member relative to the second cam along the first direction independent of the rotation of the second cam, the given cam surface and throw of each cam being such that movement of the driven member simultaneously along the first and second directions in response to the synchronized rotation of the cams results in orbital movement thereof.

The invention will be more fully understood, while further objects and advantages will become apparent, in the following detailed description of embodiments of the invention illustrated in the accompanying drawing, wherein.

Referring now to the drawing, and especially to FIGS. 1 through 4 thereof, an apparatus constructed in accordance with the invention is illustrated in the form of a work-supporting table 10. Table 10 has a frame 11, which includes a base 12 and an upstanding side wall 14, and a member in the form of a platform 16 supported upon the side wall 14. A retaining rim 18 is affixed to the uppermost peripheral edge 20 of the side wall 14 and includes an upper lip 22 which captures the platform 16 in place upon the side wall 14.

Table 10 is constructed to be placed within an electrical discharge machine 24 (see FIG. 2), beneath an electrode 26 of the machine 24. A workpiece 28 is affixed to the upper surface 30 of platform 16 to be operated upon by the electrode 26 in an electrical discharge machining operation.

Figure 1:
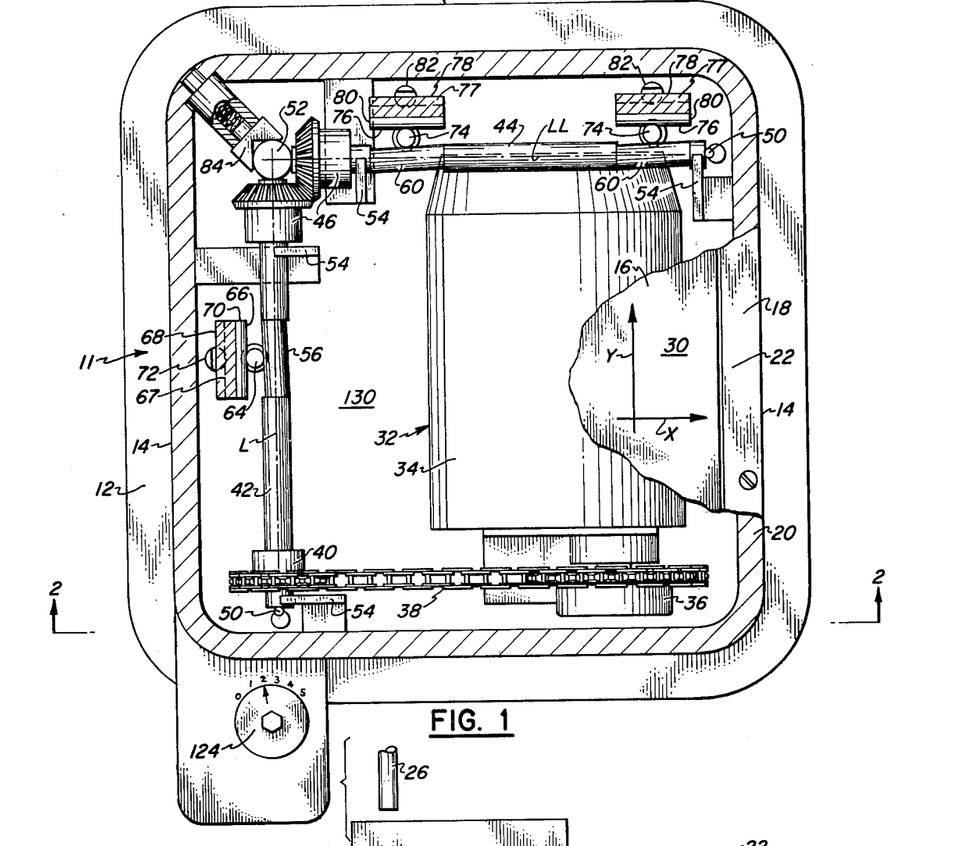
FIG. 1 is a plan view of an apparatus constructed in accordance with the invention, sectioned along line 1—1 of FIG. 4.
Figure 2:
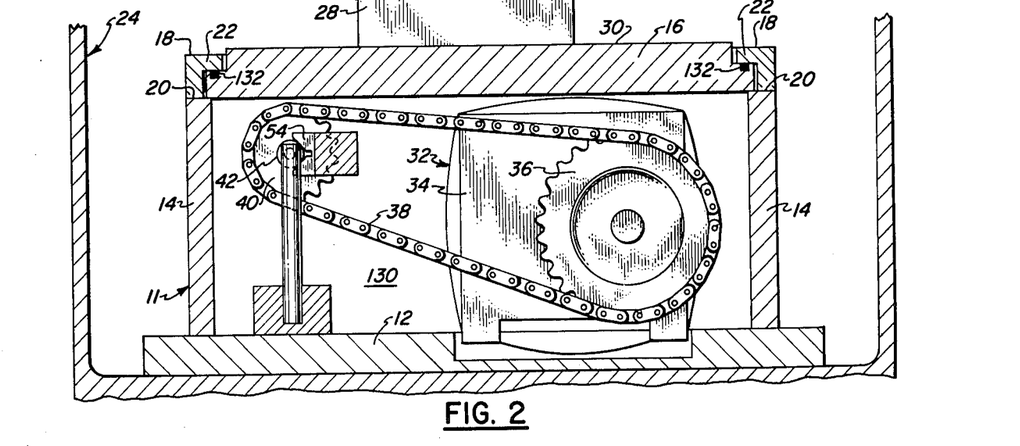
FIG. 2 is an elevational view of the apparatus, sectioned along line 2—2 of FIG. 1.

As best seen in FIGS. 1 and 2, sufficient clearance is provided between the platform 16 and retaining rim 18 to permit lateral movement of platform 16 relative to the side wall 14 and rim 18 in orthogonal directions X and Y. Beneath platform 16, within the confines of side wall 14 and base 12, there is located a drive mechanism 32 which is coupled to platform 16 by means which enables the drive mechanism to drive the platform, which is the driven member, in orbital movement. In this manner, relative orbital motion is attained between workpiece 28 and electrode 26.

Drive mechanism 32 includes a drive motor 34 mounted on the base 12 and carrying a drive sprocket 36. A drive chain 38 drives a sprocket 40 which is affixed to a first drive shaft 42 and the first drive shaft 42 is coupled with a second drive shaft 44 by means of bevel gears 46 such that the drive motor will rotate both drive shafts 42 and 44 in synchronism. The longitudinal axes L and LL of drive shafts 42 and 44, respectively, are orthogonal and each shaft is located precisely, relative to frame 11 and relative to one another, by end bearings 50 and 52 and by V-blocks 54, all carried by the frame 11.

Drive shaft 42 carries a cam 56, while drive shaft 44 includes two such cams 60. A follower in the form of a drive pin 64 lies between cam 56 and a confronting drive surface 66 provided by a bearing rod 70 carried by a leg 67 of a bracket 68 (see FIG. 4). Bracket 68 is affixed to platform 16 and leg 67 projects downwardly from the platform toward the drive shaft 42 so as to locate bearing rod 70 at drive pin 64. Resilient means in the form of a cantilever spring column 72 engages leg 67 of bracket 68 and biases the bearing rod 70 against drive pin 64, and drive pin 64 against cam 56. The resilient biasing force of the spring column 72 thus biases the drive shaft 42 into the respective V-blocks 54. Likewise, a drive pin 74 lies between each cam 60 and a confronting drive surface 76 provided by a bearing rod 80 carried by a leg 77 of a bracket 78. Brackets 78 are affixed to platform 16 and legs 77 project downwardly from the platform toward drive shaft 44 so as to locate a bearing rod 80 of each drive pin 74. Resilient means are provided in the form of cantilever spring columns 82, each spring column 82 engaging a corresponding bracket 78 to bias a bearing rod 80 against a corresponding drive pin 74 and the drive pin 74 against a corresponding cam 60. In addition, resilient means in the form of spring mechanism 84 maintains a biasing force upon the common end bearing 52 to maintain the adjacent ends of the drive shafts 42 and 44 in appropriate alignment.

Upon rotation of the drive shafts 42 and 44, by the operation of motor 34, cam 56, the throw of which extends in the X direction, i.e., perpendicular to the longitudinal axis L of drive shaft 42, will drive pin 64 and bracket 68 against the bias force of spring column 72. In this manner, bracket 68 and, hence, platform 16 will be driven through reciprocating movement along the X direction. At the same time, cams 60, each of which has a throw extending in the Y direction, i.e., perpendicular to the longitudinal axis LL of drive shaft 44, will drive pins 74 and brackets 78 against the bias force of spring columns 82. Thus, brackets 78 and, hence, platform 16 will be driven through reciprocating movement along the Y direction. The term "throw" as used herein denotes the structure of the cam which provides for the movement imparted by a cam to a corresponding follower and is akin to the eccentricity of an eccentric. Since the drive surfaces 66 and 76 are parallel to the Y and X directions, respectively, bracket 68 is free to move in the Y direction relative to the drive pin 64 and cam 56, and brackets 78 are free to move in the X direction relative to drive pins 74 and cams 60 while the platform 16 is driven in both the X and Y directions. The combined reciprocating movement of platform 16 simultaneously along the X and Y directions results in orbital movement of he driven member. Precise location and movement of the platform 16 is assured by the three-point coupling means provided by the three cams, three drive pins and three bearing rods.

Figure 5:
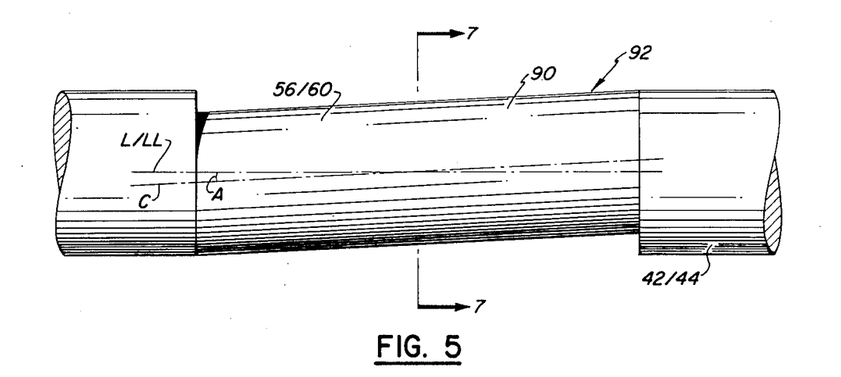
FIG. 5 is an enlarged, fragmentary plan view illustrating a segment of a drive shaft of the apparatus.
Figure 6:
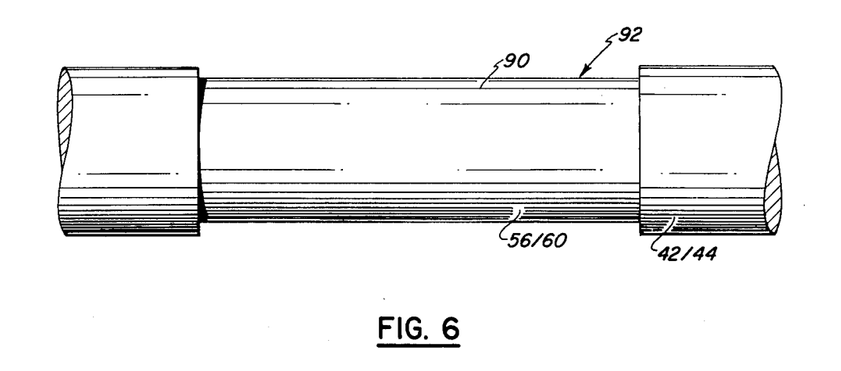
FIG. 6 is an elevational view of the segment.
Figure 7:
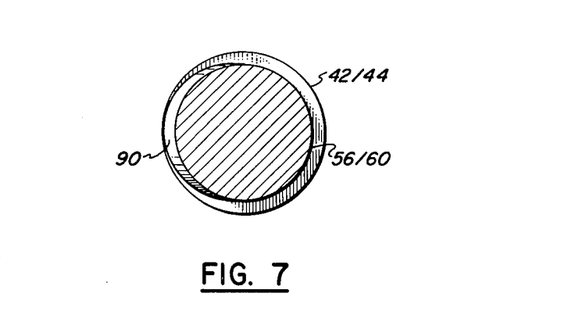
FIG. 7 is a cross-sectional view taken along line 7—7 of FIG. 5.

It is readily seen that mounting and precise location of the drive shafts 42 and 44 is attained by the simple expedients of V-blocks, end bearings, and the corresponding resilient means, portions of which also form a part of the means for coupling the cams 56 and 60 to the platform 16. As best seen in FIGS. 5 through 7, the cams themselves are fabricated readily with the necessary precision by forming a cylindrical surface 90 in each drive shaft, at the drive shaft segment 92 where the cam is located, the cylindrical surface 90 having a central axis C making an acute angle A with the longitudinal axis L, or LL, of the drive shaft 42, or 44. All of the cylindrical surfaces 90 can be fabricated with precision by grinding the corresponding segments 92 of the drive shafts to the same diameter and at the same angle A. The cylindrical surfaces 90 extend along a finite length substantially greater than the portions contacted by drive pins 64 and 74 for purpose which will now be described.

Figure 3:
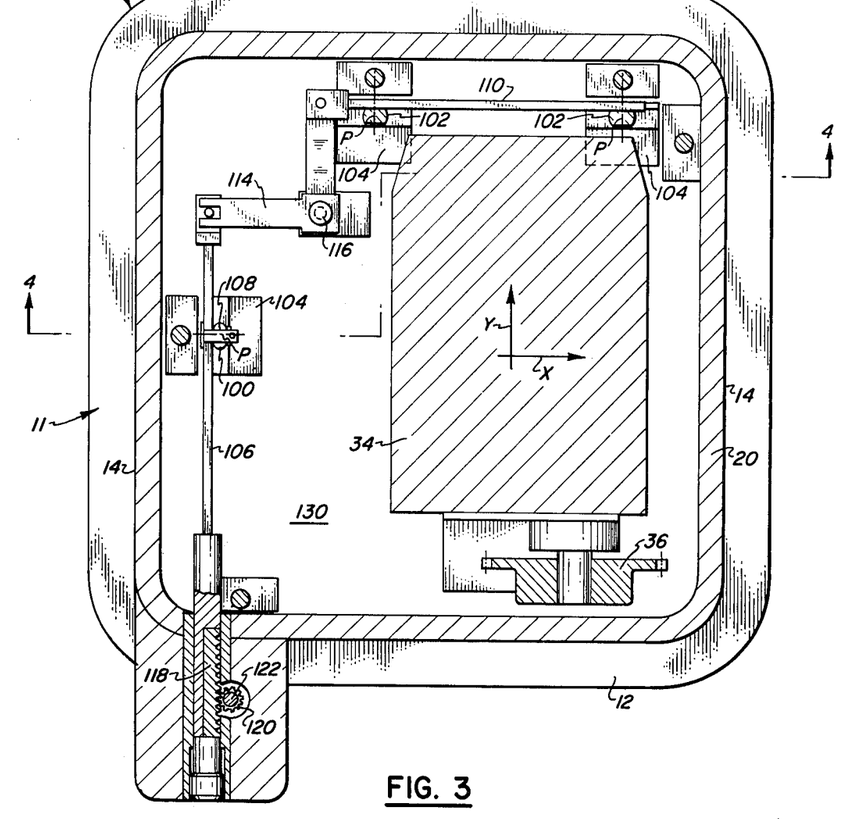
FIG. 3 is a plan view of the apparatus, sectioned along line 3—3 of FIG. 4.
Figure 4:
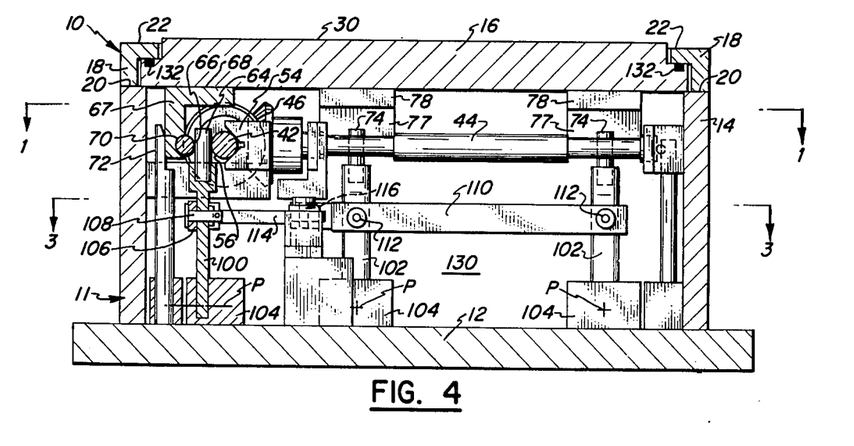
FIG. 4 is an elevational view of the apparatus, sectioned along line 4—4 of FIG. 3.

Referring now to FIGS. 1, 3 and 4, as well as to FIGS. 5 to 7, the amplitude of the orbital movement of platform 16 is selectively adjustable by selectively adjusting the stroke of the reciprocating movement along each of the X and Y directions. To this end, drive pin 64 is selectively movable in a direction parallel to axis L (the Y direction) of drive shaft 42, while drive pins 74 are likewise selectively movable in a direction parallel to axis LL (the X direction) of drive shaft 44. Since each cam 56 and 60 is comprised of a cylindrical surface 90 having a central axis C making an acute angle with the longitudinal axis of the corresponding drive shaft, the throw of each cam changes along the direction of selective movement of the drive pin which engages the cam. The stroke of the reciprocating movement of the drive pins, and the corresponding stroke of the brackets engaged by the drive pins, is directly related to the throw of the cams. Thus, selective movement of the drive pins along the cams will change the stroke of the drive pins and brackets and, hence, the amplitude of the orbital movement of the platform 16.

In order to accomplish such selective movement of the drive pins 64 and 74, drive pin 64 is carried by an arm 100 and drive pins 74 are carried by arms 102, each of the arms being mounted upon base 12 for pivotal movement about a separate pivotal axis P by means of a mounting block 104. A first link 106 is pinned to arm 100 at 108 while a second link 110 is pinned to arms 102 at 112. Both links are pinned to a bellcrank 114 mounted for rotation on the base 12 at 116. A rack 118 is affixed to one end of link 106 and is engaged by a pinion 120 (see FIG. 3), affixed to a control shaft 122 which is journalled for rotation in frame 11 and carries a dial 124 (see FIG. 1). By turning dial 124, links 106 and 110 will be displaced in a direction along the lengths thereof by equal amounts, thereby moving drive pins 64 and 74 through equal amounts of displacement and changing the stroke of the reciprocation of the drive pins accordingly. The drive surfaces 66 and 76 provided by bearing rods 70 and 80 extend in directions parallel to the displacement of drive pins 64 and 74 a distance sufficient to accommodate the displacement of the drive pins while coupling the platform 16 with the drive pins. It will be apparent that such adjustment of the amplitude of the orbital movement of the platform can be accomplished during operation of the apparatus.

The cylindrical configuration of drive pins 64 and 74 and of bearing rods 70 and 80 enables only localized contact between the drive pins and the bearing rods, thus assuring accuracy in accomplishing small changes in the stroke of the reciprocation of the drive pins with concomitant sensitivity and accuracy in changes in the amplitude of the orbital movement of platform 16.

Drive mechanism 32 may be sealed-off within the frame 11 to exclude any deleterious elements in the environment where table 10 is to be used. At the same time, the entire chamber 130 within which drive mechanism 32 is enclosed can be filled with lubricant and sealed. Thus, a seal 132 is provided around the perimeter of platform 16 to close the chamber 130 established by the base 12, side wall 14 and platform 16.

Turning now to FIGS. 8 through 11, another embodiment of the invention in the form of another apparatus constructed in accordance with the invention is illustrated in the form of a worksupporting table 210. Table 210 has a frame 211, which includes a base 212 and an upstanding side wall 214, and a member in the form of a platform 216 supported upon the side wall 214. The platform 216 is held down against the side wall 214 by magnets 218 which are affixed to the platform 216 and are attracted to magnets 220 affixed to frame 211 and juxtaposed with magnets 218.

Figure 9:
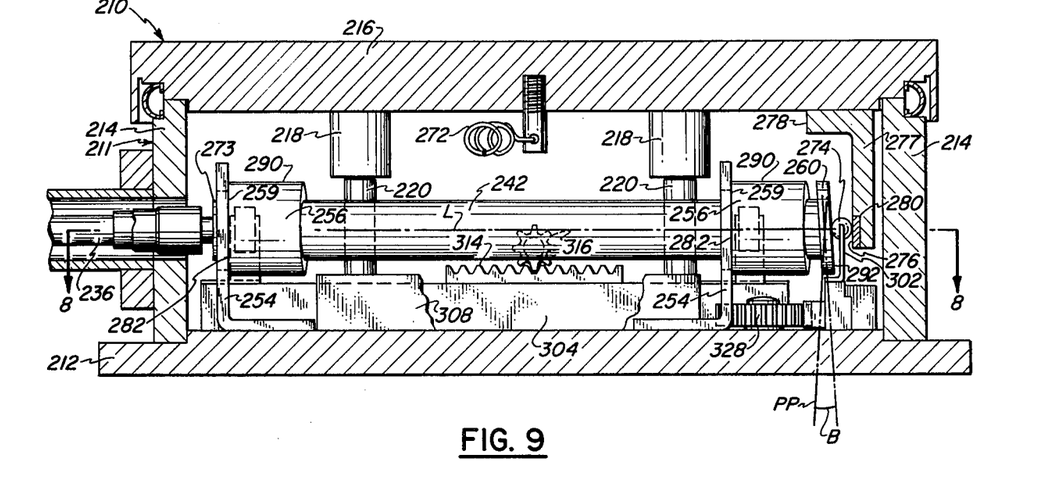
FIG. 9 is an elevational view of the apparatus of FIG. 8, sectioned along line 9—9 of FIG. 8.
Figure 10:
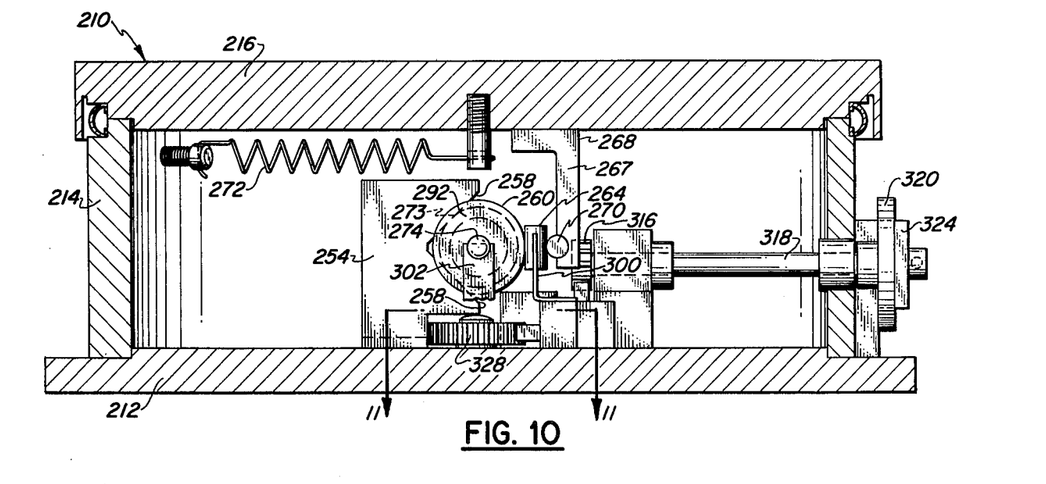
FIG. 10 is an elevational view of the apparatus of FIG. 8, sectioned along line 10—10 of FIG. 8.

As best seen in FIGS. 9 and 10, sufficient clearance is provided between the platform 216 and the side wall 214 to permit lateral movement of platform 216 relative to the side wall 214 in orthogonal directions X and Y. A drive mechanism 232 is coupled to platform 216 by means which enables the drive mechanism to drive the platform in orbital movement. Drive mechanism 232 includes a drive motor 234 located externally with respect to side wall 214. A flexible drive cable 236 is coupled to a drive shaft 242 such that the drive shaft 242 is rotated by drive motor 234. Drive shaft 242 is located precisely, relative to frame 211, by V-blocks 254 carried by the frame, as will be described in greater detail below.

Drive shaft 242 carries a pair of first cams 256, one adjacent each end of the shaft, and a second cam 260 at the end of the shaft opposite to the end which is coupled to drive cable 236. A follower in the form of a drive pin 264 serves as a drive member and lies between each cam 256 and a confronting drive surface 266 provided by a bearing rod 270 carried by a leg 267 of a bracket 268 (see FIG. 10). Brackets 268 are affixed to he platform 216 and each leg 267 projects downwardly from the platform toward the drive shaft 242 so as to locate a bearing rod 270 at a drive pin 264. Resilient means in the form of a helical spring 272 extends between the platform 216 and the side wall 214 and biases the platform in a direction which biases the bearing rods 270 against the corresponding drive pins 264, and drive pins 264 against cams 256. The resilient biasing force of helical spring 272 also locates the drive shaft 242 relative to V-blocks 254, by biasing cylindrical bearing portions 273 carried by cams 256 against the V-surfaces 258 of the V-blocks.

In a similar manner, a drive member in the form of a drive ball 274 lies between cam 260 and a confronting drive surface 276 provided by bearing pad 280 carried by leg 277 of bracket 278. Bearing pad 280 is biased against drive ball 274, and drive ball 274 is biased against cam 260 by helical spring 272. In addition, the biasing force which maintains drive ball 274 against cam 260 serves to locate drive shaft 242 longitudinally by biasing bearing shoulders 282 carried by cams 256 against bearing surfaces 259 of V-blocks 254.

Figure 8:
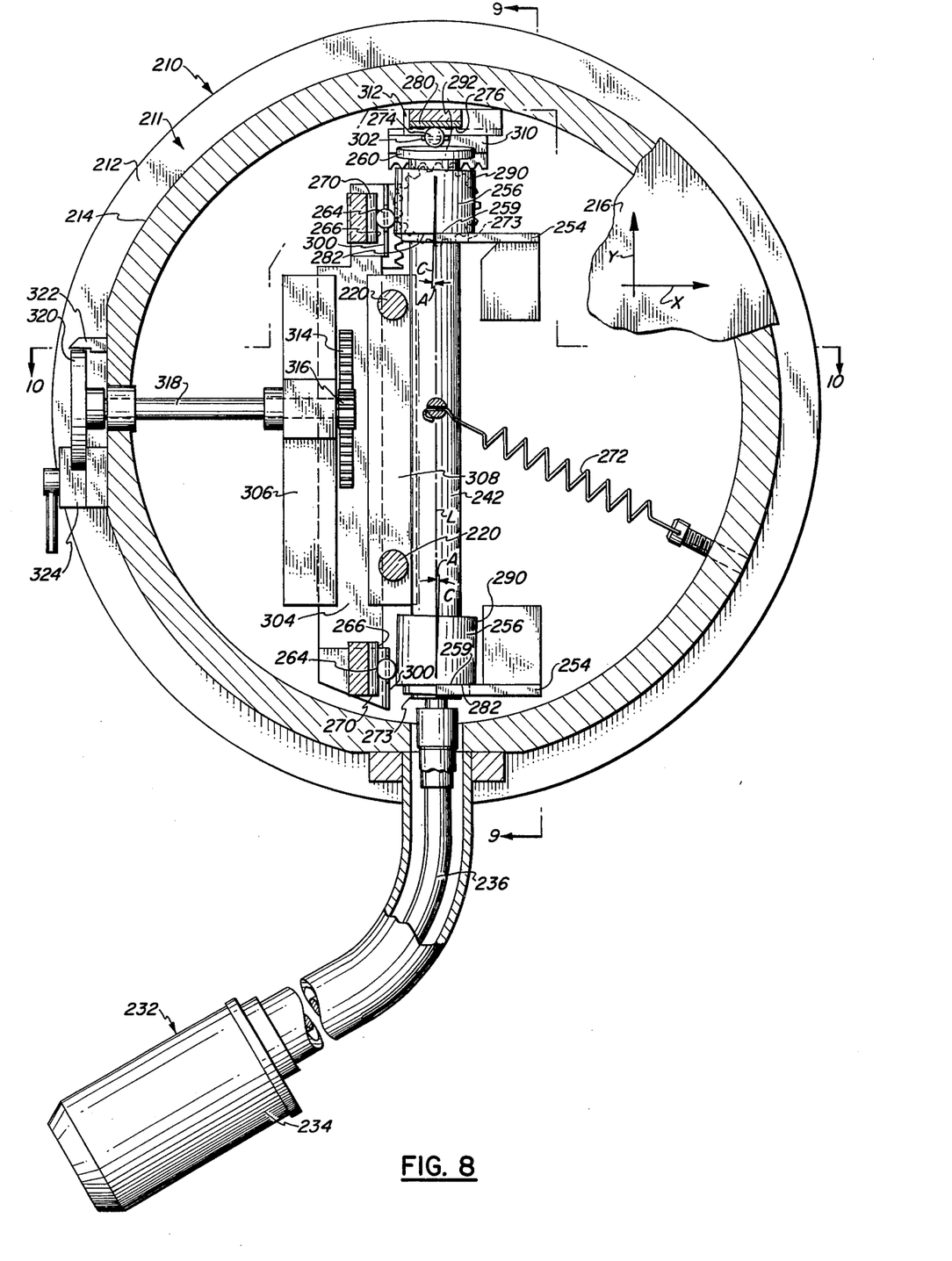
FIG. 8 is a plan view of another apparatus constructed in accordance with the invention, sectioned along line 8—8 of FIG. 9.

Upon rotation of drive 242, by the operation of motor 234, cams 256, each of which has a throw extending in the X direction, i.e., perpendicular to the longitudinal axis L of drive shaft 242, will drive pins 264 and brackets 268 against the bias force of helical spring 272. In this manner, bracket 268 and, hence, platform 216 will be driven through reciprocating movement along the X direction. At the same time, cam 260, which has a throw extending in the Y direction, i.e., parallel to the longitudinal axis L of drive shaft 242, will drive ball 274 and brackets 278 against the bias force of helical spring 272. Thus, bracket 278 and, hence, platform 216 will be driven through reciprocating movement along the Y direction. Since the drive surfaces 266 and 276 are parallel to the Y and X directions, respectively, brackets 268 are free to move in the Y direction relative to the drive pins 254 and cams 256, and bracket 278 is free to move in the X direction relative to drive ball 274 and cam 260 while the platform is driven in both the X and Y directions. The combined reciprocating movement of platform 216 simultaneously along the X and Y directions results in orbital movement of the driven member. Precise location and movement of the platform 216 is assured by the three-point coupling means provided by the three cams and the related coupling means.

Figure 11:
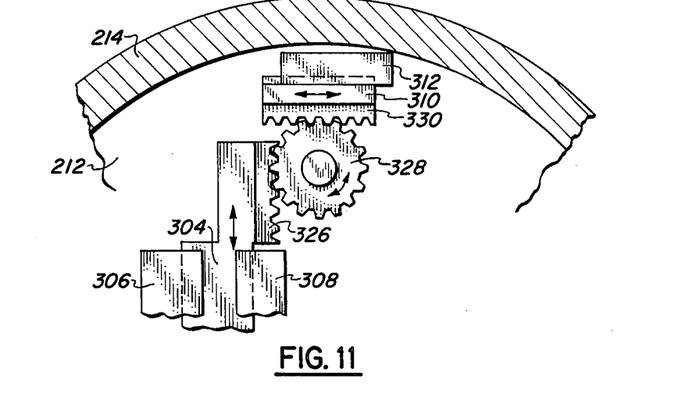
FIG. 11 is a fragmentary cross-sectional view taken along line 11—11 of FIG. 10.

Mounting and precise location of the drive shaft 242 is attained by the simple expedients of V-blocks and corresponding bearing surfaces provided on the drive shaft, together with the resilient means provided by helical spring 272, which also forms a part of the means for coupling the cams and the platform. The cams 256 are fabricated readily with the necessary precision by forming a cylindrical surface 290 on each cam, cylindrical surface 290 having a central axis C. Each cam 256 is then affixed in place on the drive shaft 242 so that central axis C makes an acute angle A with the longitudinal axis L of drive shaft 242. Each cam 256 is provided with the bearing shoulder 282 and an extension which supplies the cylindrical bearing portions 273. Cam 260 has a flat surface 292 which makes an acute angle B with a plane PP perpendicular to longitudinal axis L of drive shaft 242. Thus, cam 260 is fabricated readily as a plate and is affixed at the end of drive shaft 242, in the manner of a swash plate.

The amplitude of the orbital movement of platform 216 is selectively adjustable by selectively adjusting the stroke of the reciprocating movement along each of the X and Y directions. To this end, drive pins 264 are selectively movable in a direction parallel to axis L (the Y direction) of drive shaft 242, while drive ball 274 is selectively movable in a direction perpendicular to axis L (the X direction), parallel to plane PP. Since cams 256 are comprised of a cylindrical surface 290 having a central axis C making an acute angle A with axis L, and since cam 260 has a flat surface 292 which makes an acute angle B with plane PP, the throw of each cam changes along the direction of selective movement of the drive members, in the form of a drive pin or drive ball, which engage the cam. The stroke of the reciprocating movement of the drive pins and drive ball and the corresponding stroke of the brackets engaged by the drive pins and drive ball, is directly related to the throw of the cams. Thus, selective movement of the drive pins and the drive ball along the cams will change the stroke of the drive pins and the drive ball, and the brackets, and, hence, the amplitude of the orbital movement of the platform 216.

In order to accomplish such selective movement of the drive pins 264 and drive ball 274, drive pins 264 are each carried by an arm 300 and drive ball 274 is carried by an arm 302. Arms 300 are flexible in the X direction, but not in the Y direction and are affixed to a first slide 304 which is mounted for sliding movement relative to frame 211 parallel to the longitudinal axis L (in the Y direction) by means of guide blocks 306 and 308 fixed to base 212. Likewise, arm 302 which is flexible in the Y direction, but not in the X direction, is affixed to a second slide 310 which is mounted for sliding movement relative to frame 211 perpendicular to the longitudinal axis L (in the X direction) by means of a guide block 312 fixed to base 212. A first rack 314 carried by first slide 304 is engaged by a pinion 316 carried by a control shaft 318 journaled for rotation in frame 211. A control dial 320 is carried by control shaft 318 outside the side wall 214 and is juxtaposed with a pointer 322 and a clamp 324. Upon release of clamp 324, dial 320 may be rotated to rotate control shaft 318 and pinion 316 to move first slide 304 in the Y direction, together with drive pins 264. Simultaneously, a second rack 326, also carried by slide 304, will move in the Y direction, rotating another pinnon 328 which engages a rack 330 on second slide 310 to move slide 310 in the X direction, together with drive ball 274. Thus, by turning dial 320, slides 304 and 310 each will be displaced in a direction along the length thereof by equal amounts, thereby moving drive pins 264 and drive ball 274 through equal amounts of displacement and changing the stroke of the reciprocation of the drive pins and drive ball accordingly. The drive surfaces 266 and 276 provided by bearing rods 270 and bearing pad 280 extend in directions parallel to the displacement of drive pins 264 and drive ball 274 a distance sufficient to accommodate the displacement of the drive pins and drive ball while coupling the platform 216 with the drive pins and drive ball. Once the appropriate adjustment of the amplitude of the orbital movement of the platform is made, clamp 324 may be closed to fix the position of dial 320 and slides 304 and 310. Adjustment can be made during operation of the apparatus.

It is to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for obtaining orbital movement of a driven member, said apparatus comprising:
    a frame;
    a first cam mounted for rotation on the frame, said first cam having a given cam surface and throw, the throw of said first cam extending in a first direction;
    a second cam mounted for rotation of the frame, said second cam having a given cam surface and throw, the throw of said second cam extending in a second direction transverse to the first direction;
    drive means for simultaneously rotating both cams in synchronism;
    first coupling means coupling the driven member with the first cam for reciprocating movement along said first direction in response to rotation of the first cam, said first coupling means permitting simultaneous reciprocating movement of the driven member relative to the first cam along said second direction independent of said rotation of the first cam; and
    second coupling means coupling the driven member with the second cam for reciprocating movement along the second direction in response to rotation of the second cam, said second coupling means permitting simultaneous reciprocating movement of the driven member relative to the second cam along the first direction independent of said rotation of the second cam;
    the given cam surface and throw of each cam being such that movement of the driven member simultaneously along said first and second directions in response to the synchronized rotation of the cams results in orbital movement thereof.

2. The invention of claim 1 wherein:
    the first cam is mounted for rotation about a first axis of rotation; and
    the second cam is mounted for rotation about a second axis of rotation transverse to said first axis of rotation.

3. The invention of claim 2 wherein said axes are orthogonal.

4. The invention of claim 3 including a shaft mounted upon the frame for rotation about an axis of rotation, the cam surface of at least one of the cams including a generally cylindrical surface on the shaft, said cylindrical surface having a central axis making an acute angle with the direction of the axis of rotation of the shaft.

5. The invention of claim 1 wherein the first and second cams are mounted for rotation about the same axis of rotation.

6. The invention of claim 5 including a shaft mounted upon the frame for rotation about an axis of rotation, the cam surface of said first cam including a generally cylindrical surface on the shaft, said cylindrical surface having a central axis making an acute angle with the direction of the axis of rotation of the shaft.

7. The invention of claim 6 wherein the cam surface of the second cam includes a generally flat surface making an acute angle with a plane perpendicular to the axis of rotation of the shaft.

8. The invention of claim 1 wherein the throw of the first cam changes along a direction generally parallel with the second direction and the first coupling means includes a follower engaging the cam surface of the first cam and selectively movable along said parallel direction for selectively changing the stroke of the driven member along the first direction.

9. The invention of claim 8 wherein the coupling means includes means providing a drive surface on said driven member, the drive surface being generally parallel to said parallel direction and confronting the cam surface of the first cam along the length of travel of the follower in said parallel direction, the follower being located between the drive surface and the first cam, and resilient means biasing the drive surface against the follower and thereby urging the follower against the first cam to enable reciprocating movement of the driven member in a direction normal to the drive surface in response to rotation of the first cam.

10. The invention of claim 9 including a shaft mounted upon the frame for rotation about an axis of rotation, the cam surface of said first cam comprising a generally cylindrical surface on the shaft, said cylindrical surface having a central axis making an acute angle with the direction of the axis of rotation of the shaft.

11. The invention of claim 10 wherein the cam surface of the second cam includes a generally flat surface making an acute angle with a plane perpendicular to the axis of rotation of the shaft.

12. Apparatus for obtaining orbital movement of a driven member, said apparatus comprising:
a frame;
a first drive shaft mounted on the frame for rotation bout a first longitudinal axis;
a second drive shaft mounted on the frame for rotation about a second longitudinal axis extending at an angle to the first axis;
drive means for rotating said drive shafts in synchronism;
a first cam on the first drive shaft, the first cam including a given cam surface extending along the first axis and having a throw perpendicular thereto;
a second cam on the second drive shaft, the second cam including a given cam surface extending along the second axis and having a throw perpendicular thereto;
first coupling means coupling the driven member with the first cam for reciprocating movement parallel to the second axis in response to rotation of the first drive shaft, said first coupling means permitting simultaneous reciprocating movement of the driven member relative to the first cam parallel to the first axis independent of said rotation of the first drive shaft; and
second coupling means coupling the driven member with the second cam for reciprocating movement parallel to the first axis in response to rotation of the second drive shaft, said second coupling means permitting simultaneous reciprocating movement of the driven member relative to the second cam parallel to the second axis independent of said rotation of the second drive shaft;
the given cam surface and throw of each cam being such that movement of the driven member simultaneously parallel to the first and second axes in response to the synchronized rotation of the drive shafts results in orbital movement thereof.

13. The invention of claim 12 wherein said shafts and said axes are orthogonal.

14. The invention of claim 13 wherein the throw of each cam changes along the axial extent of the cam and each coupling means includes:
a follower engaging the respective cam and being selectively movable along a path of displacement parallel to the axial extent of the respective cam; and
means for moving the follower to a selected position along said path to selectively change the stroke of the driven member in accordance with the change in the throw of the respective cam.

15. The invention of claim 14 wherein the driven member includes a platform juxtaposed with and spaced from the drive shafts, and the coupling means includes:
means projecting from the platform toward the drive shafts and providing a drive surface confronting the cam surface of each cam along the length of displacement of each follower, each follower being located between a drive surface and a corresponding cam; and
resilient means biasing each drive surface against the corresponding follower and thereby urging each follower against a corresponding cam to enable reciprocating movement of the platform in directions normal to each drive surface in response to rotation of the drive shafts.

16. The invention of claim 15 wherein each follower includes a drive pin mounted upon the frame for pivotal movement and projecting between a corresponding drive surface and cam surface, and the means for moving the follower includes means linking the drive pins together for simultaneous movement through selected displacements.

17. The invention of claim 15 wherein the first drive shaft carries a single first cam and the second drive shaft carries a pair of second cams spaced axially from one another.

18. The invention of claim 15 wherein the cam surface of the cams each include a generally cylindrical surface on the corresponding drive shaft, said cylindrical surface having a central longitudinal axis making an acute angle with the longitudinal axis of the respective drive shaft.

19. In an apparatus for obtaining accurate orbital movement of a driven member, the apparatus including a pair of drive shafts mounted for synchronized rotation about an axis of rotation extending at an angle to one another, at least two cams carried by one of the drive shafts and at least one cam carried by the other of the drive shafts, and coupling means coupling the driven member to the cams for simultaneous reciprocating movement in directions normal to the axes of rotation, the improvement wherein each cam comprises a generally cylindrical surface on the corresponding drive shaft, said cylindrical surface having a central longitudinal axis making an acute angle with the axis of rotation of the respective drive shaft.

20. The invention of claim 19 wherein the driven member is coupled to each cam through means including a follower engaging that cam, said follower being selectively movable in a direction parallel to the corresponding axis of rotation, and said cylindrical surface having an axial length sufficient to accommodate movement of the follower in said direction while maintaining the engagement between the follower and the cam such that selective movement of the follower results in a selected change in the stroke of the reciprocating movement of the driven member.

21. Apparatus for obtaining orbital movement of a driven member, said apparatus comprising:
a frame;
a drive shaft mounted on the frame for rotation about a longitudinal axis;
drive means for rotating said drive shaft;
a first cam on the drive shaft, the first cam including a given cam surface extending along the axis and having a throw perpendicular thereto;
a second cam on the drive shaft, the second cam including a given cam surface extending perpendicular to the axis and havng a throw parallel thereto;
first coupling means coupling the driven member with the first cam for reciprocating movement perpendicular to the axis in response to rotation of the first cam, said first coupling means permitting simultaneous reciprocating movement of the driven member relative to the first cam parallel to the axis independent of the rotation of the first cam;

second coupling means coupling the driven member with the second cam for reciprocating movement parallel to the axis in response to rotation of the second cam, said second coupling means permitting simultaneous reciprocating movement of the driven member relative to the second cam perpendicular to the axis independent of the rotation of the second cam;

the given cam surface and throw of each cam being such that movement of the driven member simultaneously perpendicular and parallel to the axis in response to the rotation of the drive shaft and the cams results in orbital movement thereof.

22. The invention of claim 21 wherein the throw of each cam changes along the extent of the cam and each coupling means includes:

a follower engaging the respective cam and being selectively movable along a path of travel parallel to the extent of the respective cam; and means for moving the follower to a selected position along said path to selectively change the stroke of the driven member in accordance with the change in the throw of the respective cam.

23. The invention of claim 22 wherein the driven member includes a platform juxtaposed with the spaced from the drive shaft, and the coupling means includes:

means projecting from the platform toward the drive shaft and providing a drive surface confronting the cam surface of each cam along the length of travel of each follower, each follower being located between a drive surface and a corresponding cam; and resilient means biasing each drive surface against the corresponding follower and thereby urging each follower against a corresponding cam to enable reciprocating movement of the platform in directions normal to each drive surface in response to rotation of the drive shaft.

24. The invention of claim 23 wherein each follower includes a drive member mounted upon the frame for movement parallel to the extent of a corresponding cam and projecting between a corresponding drive surface and cam, and the means for moving the follower includes means cooperating with the drive members to enable simultaneous movement of the drive members through selected displacements.

25. The invention of claim 23 wherein the drive shaft carries a pair of first cams and a single second cam.

26. The invention of claim 25 wherein the cam surface of the first cams each include a generally cylindrical surface on the drive shaft, each said cylindrical surface having a central longitudinal axis making an acute angle with the longitudinal axis of the drive shaft.

27. The invention of claim 26 wherein the cam surface of the second cam includes a flat surface making an acute with a plane perpendicular to the axis of rotation of the drive shaft.

28. In an apparatus for obtaining accurate orbital movement of a driven member by virtue of the rotation of cams carried by a drive shaft mounted for rotation about an axis of rotation, the driven member being coupled to the cams for simultaneous reciprocating movement in directions normal and parallel to the axis of rotation, the improvement wherein at least one cam has a throw perpendicular to said axis of rotation and comprises a generally cylindrical cam surface on the drive shaft, said cylindrical cam surface having a central longitudinal axis making an acute angle with the axis of rotation of the drive shaft, and another cam has a throw parallel to said axis of rotation and comprises a generally flat cam surface making an acute angle with a plane perpendicular to the axis of rotation of the drive shaft.

29. The invention of claim 28 wherein the driven member is coupled to each cam through means including a follower engaging that cam, each said follower being selectively movable in a direction normal to the throw of the respective cam, and said cam surfaces having an extent sufficient to accommodate movement of the follower in said direction while maintaining the engagement between the follower and the cam such that selective movement of the follower results in a selected change in the stroke of the reciprocating movement of the driven member.

* * * * *